United States Patent
Toda

(10) Patent No.: US 6,427,919 B1
(45) Date of Patent: Aug. 6, 2002

(54) RECOGNITION SYSTEM FOR IDENTIFICATION-CARD SINGULARITY

(76) Inventor: Kohji Toda, 1-49-18 Futaba, Yokosuka 239-0814 (JP)

( * ) Notice: Subject to any disclaimer, the term of this patent is extended or adjusted under 35 U.S.C. 154(b) by 0 days.

(21) Appl. No.: 09/747,410

(22) Filed: Dec. 19, 2000

(51) Int. Cl.$^7$ .............................. G06K 19/06; G06K 7/00
(52) U.S. Cl. ........................................ 235/492; 235/439
(58) Field of Search ................................. 235/487, 492, 235/375, 441, 491; 340/5.61, 5.8; 367/155, 157; 365/52

(56) References Cited

U.S. PATENT DOCUMENTS

| | | | |
|---|---|---|---|
| 4,096,477 A | * 6/1978 | Epstein et al. | 310/313 B |
| 4,658,252 A | * 4/1987 | Rowe | 235/435 |
| 4,663,664 A | * 5/1987 | Regan et al. | 235/487 |
| 4,792,667 A | * 12/1988 | Chen | 235/441 |
| 4,931,991 A | * 6/1990 | Cvijanovich | 235/441 |
| 5,130,522 A | * 7/1992 | Yamanouchi et al. | 235/439 |
| 6,121,892 A | * 9/2000 | Reindl et al. | 340/5.8 |

FOREIGN PATENT DOCUMENTS

JP  402194488 A  * 8/1990

* cited by examiner

Primary Examiner—Michael G. Lee
Assistant Examiner—Larry D Taylor

(57) ABSTRACT

A recognition system for identification-card singularity comprises an identification card, a detail communication device attached to a detail computer, and a master communication device attached to a master computer. If the identification card is set in the detail communication device, a pulse is generated at the detail communication device at regular intervals. When the pulse is applied to the identification card, an individual SAW is excited therein. The individual SAW is converted into an individual double-coded digital-signal at the detail communication device and delivered into a digital network. When the individual double-coded digital-signal is received by the master communication device, the signal decoding is achieved, so that the identification-card singularity is recognized by the master communication device.

9 Claims, 6 Drawing Sheets

RECOGNITION SYSTEM FOR IDENTIFICATION-CARD SINGULARITY

BACKGROUND OF THE INVENTION

1. Field of the Invention

The present invention relates to a recognition system for identification-card singularity on digital network communication between a master station and detail stations by means of using a master communication device attached to the master station, detail communication devices attached to the detail stations, respectively, and identification cards set in the detail communication devices, respectively.

2. Description of the Prior Art

It is most important on digital network communication to prevent the influence of noises and invaders. However, it is difficult to keep the communication secret by the coding technique based on conventional hard-wears such as magnetic cards and IC cards. The magnetic cards are very convenient and popular, however it is easy to make copies thereof or steal passwords. Therefore damages by unlawful using of credit cards, cash cards, prepaid cards, and so on are increasing year after year. The IC cards are superior to the magnetic cards in difficulty in counterfeiting of cards, however it is not enough to keep the communication secret thoroughly. Thus, conventional hard-wears have problems on keeping a communication security.

SUMMARY OF THE INVENTION

An object of the present invention is to provide an identification card useful as credit card, cash card, key, and others.

Another object of the present invention is to provide an identification card excellent in difficulty in counterfeiting and stealing of passwords.

Another object of the present invention is to provide a recognition system for identification-card singularity capable of recognizing the identification-card singularity in secret.

Another object of the present invention is to provide a recognition system for identification-card singularity capable of low electric power consumption.

Another object of the present invention is to provide a recognition system for identification-card singularity excellent in durability and manufacturing.

A still other object of the present invention is to provide a recognition system for identification-card singularity having a small size and a simple structure.

According to one aspect of the present invention there is provided a recognition system for identification-card singularity comprising a master communication device attached to a master computer, a detail communication device attached to a detail computer, and an identification card set in the detail communication device. The identification card consists a first piezoelectric substrate, an individual coded interdigital transducer (IDT), and a first electrode-group. The individual coded IDT consists of interdigital electrode pairs Pi (i=1, 2, . . . , n), of which two neighbors are at a distance L from each other, and has an individual coded pattern. The first electrode-group consists of an interdigital electrode $I_0$ and an interdigital electrode $I_i$ (i=1) at a distance iL (i=1) from the interdigital electrode $I_0$. The detail communication device consists of a second piezoelectric substrate and transmitting- and receiving sections. The transmitting section is composed of a first bipolar-pulse generator, first and second coded IDTs, a second electrode-group, an envelope detecting device, and a monopolar-pulse generator. The first coded IDT consists of interdigital electrode pairs Pi (i=1, 2, . . . , n), of which two neighbors are at the distance L from each other, and has a first coded pattern. The second coded IDT has the same construction as the first coded IDT except for having a second coded pattern. The second electrode-group consists of an interdigital electrode $A_0$ and an interdigital electrode $A_i$ (i=1 at the distance iL (i=1) from the interdigital electrode $A_0$. The envelope detecting device is connected with the second electrode-group. The master communication device has the same construction as the detail communication device, and consists of a third piezoelectric substrate and transmitting- and receiving sections. The receiving section is composed of a third electrode-group, a second bipolar-pulse generator, an intermediary IDT, third and fourth coded IDTs, and a detecting device. The third electrode-group consists of a central interdigital electrode $B_{0M}$, a left interdigital electrode $B_{1M}$ at a distance $L_0$ from the central interdigital electrode $B_{0M}$, and a right interdigital electrode $B_{iM}$ (i=1) at a distance $L_0$+iL (i=1) from the central interdigital electrode $B_{0M}$. The third coded IDT has the same construction as the first coded IDT except for having a third coded pattern. The fourth coded IDT has the same construction as the first coded IDT except for having a fourth coded pattern.

If the identification card is set in the detail communication device, a pulse generated at the first bipolar-pulse generator is applied to the individual coded IDT, so that an individual SAW corresponding to the individual coded pattern is excited on the first piezoelectric substrate. The individual SAW is detected as an individual coded burst-signal at the interdigital electrode $I_0$, and after a time corresponding to the distance L, at the interdigital electrode $I_1$ again. The individual coded burst-signals at the interdigital electrodes $I_0$ and $I_1$ form an individual double-coded burst-signal, which arrives at the monopolar-pulse generator via the envelope detecting device. Thus, an individual double-coded digital-signal is obtained at the monopolar-pulse generator, and is delivered into a digital network. On the other hand, when the individual double-coded digital-signal arrives at the master communication device, it is received at the left interdigital electrode $B_{-1M}$ and the right interdigital electrode $B_{1M}$, respectively. In this time, first- and second SAWs are excited on the third piezoelectric substrate. The first SAW arrives at the central interdigital electrode $B_{0M}$ by a time corresponding to the distance L before the second SAW arrives at the central interdigital electrode $B_{0M}$. As a result, the individual double-coded digital-signal is converted into an individual mono-coded burst-signal at the central interdigital electrode $B_{0M}$. The individual mono-coded burst-signal is converted into an individual mono-coded digital-signal at the second bipolar-pulse generator. The individual mono-coded digital-signal is applied to the intermediary IDT. And then, a third SAW composed of an individual coded row of burst-wave groups is excited on the third piezoelectric substrate. When the burst-wave group correlates to the third- and fourth coded patterns, respectively, first- and second decoded pulses are detected at the third- and fourth coded IDTs, respectively. As a result, an output digital-signal equivalent to the individual coded pattern, is detected at the detecting device. Therefore, the identification-card singularity is recognized from the output digital-signal.

In addition, for further securing such a communication system, a double-coded request digital-signal asking for password is delivered from the transmitting section of the master communication device into the digital network toward the detail communication device just after recognition of the identification-card singularity. The double-coded request digital-signal asking for password is received at the receiving section of the detail communication device through the digital network. And then, a double-coded password digital-signal is delivered from the transmitting section of the detail communication device into the digital network. The double-coded password digital-signal is received at the receiving section of the master communication device through the digital network. Thus, the communication between the master communication device and the detail communication device starts.

According to another aspect of the present invention there are provided first-, second-, third-, and fourth coded IDTs consisting of at least three interdigital electrode pairs, respectively.

According to another aspect of the present invention there are provided third- and fourth coded IDTs having third- and fourth coded patterns in reverse to the first- and second coded patterns, respectively.

According to another aspect of the present invention there is provided an individual coded IDT constructed of multiple times four coded IDTs classified into at most two types that correspond to the first- and second coded IDTs, respectively.

According to another aspect of the present invention there is provided a bipolar-pulse generator in place of the monopolar-pulse generator.

According to another aspect of the present invention there is provided an individual coded IDT comprising at least two parts that are electrically separated and in uneven parallel with each other. The parts excite individual SAWs, respectively, on the first piezoelectric substrate when receiving the pulse from the first bipolar-pulse generator simultaneously. The interdigital electrode $I_0$ detects individual coded burst-signals one by one when receiving the individual SAWs. The interdigital electrode $I_1$ also detects the individual coded burst-signals one by one when receiving the individual SAWs. As a result, the individual coded burst-signals at the interdigital electrodes $I_0$ and $I_1$ form a mixed double-coded burst-signal corresponding to the individual double-coded burst-signal received at the envelope detecting device.

According to other aspect of the present invention there are provided an individual coded IDT comprising first- and second parts that are electrically separated and vertical from each other, and an identification card further comprising a fourth electrode-group that consists of an interdigital electrode $J_0$ and an interdigital electrode $J_i$ (i=1) at a distance iL (i=1) from the interdigital electrode $J_0$. The first- and second parts excite first- and second individual SAWs, respectively, on the first piezoelectric substrate when receiving the pulse from the first bipolar-pulse generator simultaneously. The interdigital electrode $J_0$ detects a first individual coded burst-signal corresponding to the first individual SAW. The interdigital electrode $J_1$ detects the first individual coded burst-signal again. The interdigital electrode $I_0$ detects a second individual coded burst-signal corresponding to the second individual SAW just after the interdigital electrode $J_0$ detects the first individual coded burst-signal. The interdigital electrode $I_1$ detects the second individual coded burst-signal just after the interdigital electrode $J_1$ detects the first individual coded burst-signal. As a result, the first- and second individual coded burst-signals at the interdigital electrodes $J_0$, $J_1$, $I_0$ and $I_1$ form a mixed double-coded burst-signal corresponding to the individual double-coded burst-signal received at the envelope detecting device.

According to a further aspect of the present invention there are provided a first electrode-group, a second electrode-group, a third electrode-group, an identification card, a transmitting section, and a receiving section. The first electrode-group includes at least two interdigital electrodes $I_i$ {i=1, 2, ..., (n−1)} at a distance iL {i=1, 2, ..., (n−1)}, respectively, from the interdigital electrode $I_0$. The second electrode-group includes at least two interdigital electrodes $A_i$ {i=1, 2, ..., (n−1)} at a distance iL {i=1, 2, ..., (n−1)}, respectively, from the interdigital electrode $A_0$. The third electrode-group includes at least two right interdigital electrodes $B_{iM}$ {i=1, 2, ..., (n−1)} at a distance $L_0$+iL {i=1, 2, ...(n−1)}, respectively, from the central interdigital electrode $B_{0M}$. The identification card further comprises a first switch that connects the envelope detecting device with the interdigital electrodes $I_i$ in turn. The transmitting section further comprises a second switch that connects the envelope detecting device with the interdigital electrodes $A_i$ in turn. The receiving section further comprises a third switch that connects the digital network with the right interdigital electrode $B_{iM}$ in turn.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
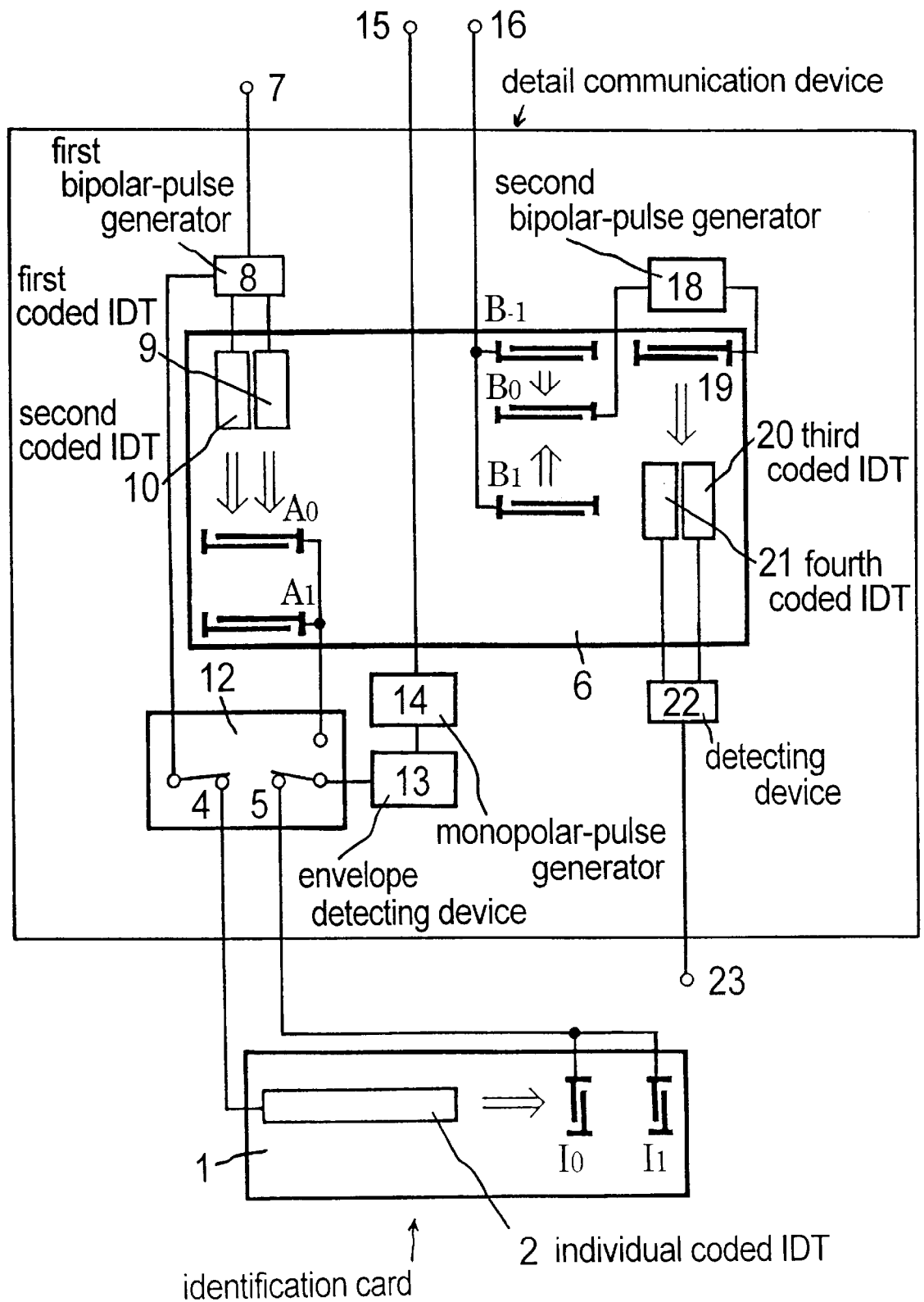
FIG. 1 shows a schematic illustration of a detail communication device with an identification card, in a recognition system for identification-card singularity, according to a first embodiment of the present invention.

FIG. 1 shows a schematic illustration of a detail communication device with an identification card, in a recognition system for identification-card singularity, according to a first embodiment of the present invention. The recognition system for identification-card singularity comprises the identification card, the detail communication device attached to a detail computer, and a master communication device attached to a master computer. The identification card comprises first piezoelectric substrate 1, individual coded IDT 2, first electrode-group 3 consisting of interdigital electrodes $I_0$ and interdigital electrode $I_1$ at the distance L from interdigital electrode $I_0$, electrode terminal 4, and electrode terminal 5. Individual coded IDT 2, made of an aluminum thin film, is formed on first piezoelectric substrate 1. First electrode-group 3, made of an aluminum thin film, is formed on first piezoelectric substrate 1, and has an interdigital periodicity of 40 μm. First piezoelectric substrate 1 is made of a piezoelectric ceramic thin plate with a dimension of 200 μm in thickness. It is possible to use LiNbO$_3$ and so on in place of the piezoelectric ceramic plate. The detail communication device comprises second piezoelectric substrate 6 and transmitting- and receiving sections. The transmitting section consists of electrode terminal 7, first bipolar-pulse generator 8, first coded IDT 9, second coded IDT 10, second electrode-group 11 consisting of interdigital electrode $A_0$ and interdigital electrode $A_1$ at the distance L from interdigital electrode $A_0$, setting switch 12, envelope detecting device 13, monopolar-pulse generator 14, and electrode terminal 15. The receiving section consists of electrode terminal 16, third electrode-group 17 consisting of central interdigital electrode $B_0$, left interdigital electrode $B_{-1}$, and right interdigital electrode $B_1$, second bipolar-pulse generator 18, intermediary IDT 19, third coded IDT 20, fourth coded IDT 21, detecting device 22, and electrode terminal 23. Left interdigital electrode $B_{-1}$ is at a distance $L_0$ from central interdigital electrode $B_0$. Right interdigital electrode $B_1$ is at a distance $L_0+L$ from central interdigital electrode $B_0$. First coded IDT 9, second coded IDT 10, second electrode group 11, third electrode-group 17, intermediary IDT 19, third coded IDT 20, and fourth coded IDT 21, made of an aluminum thin film, respectively, are formed on second piezoelectric substrate 6 made of a piezoelectric ceramic thin plate with a dimension of 200 $\mu$m in thickness. It is possible to use $LiNbO_3$ and so on in place of the piezoelectric ceramic plate. Second electrode group 11, third electrode-group 17, and intermediary IDT 19 have an interdigital periodicity of 40 $\mu$m, respectively.

Figure 2:
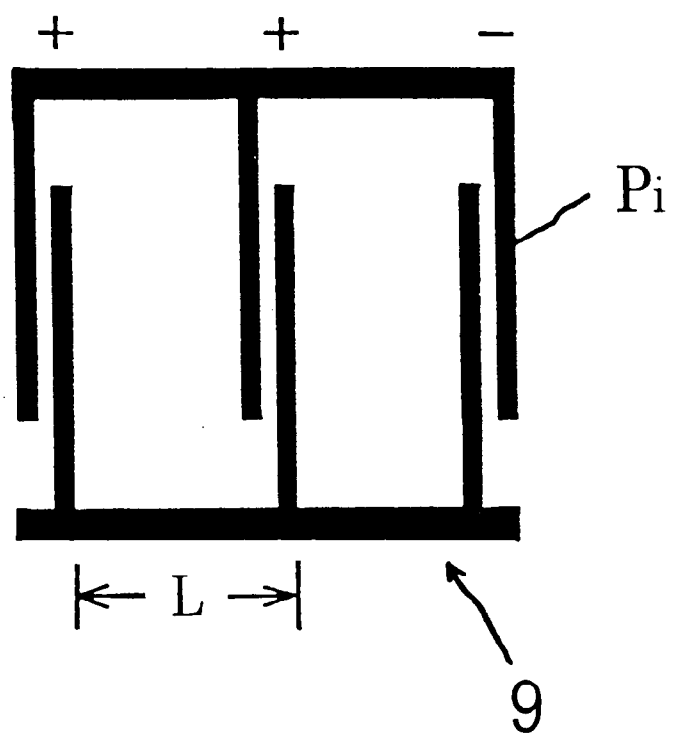
FIG. 2 shows a plan view of first coded IDT 9.

FIG. 2 shows a plan view of first coded IDT 9 consisting of three interdigital electrode pairs Pi (i=1, 2, and 3), of which two neighbors are at a distance L from each other. Each pair has an interdigital periodicity of 40 $\mu$m. First coded IDT 9 has a first coded pattern based on the Baker code. Second coded IDT 10 also consists of three interdigital electrode pairs, and has a second coded pattern. Third coded IDT 20 has a third coded pattern in reverse to the first coded pattern. Fourth coded IDT 21 has a fourth coded pattern in reverse to the second coded pattern. Besides a three-digits code (1, 1, 0) as shown in FIG. 2, for example, a seven-digits code (1, 1, 1, 0, 0, 1, 0), an eleven-digits code (1, 1, 1, 0, 0, 0, 1, 0, 0, 1, 0), and others are available.

Figure 3:
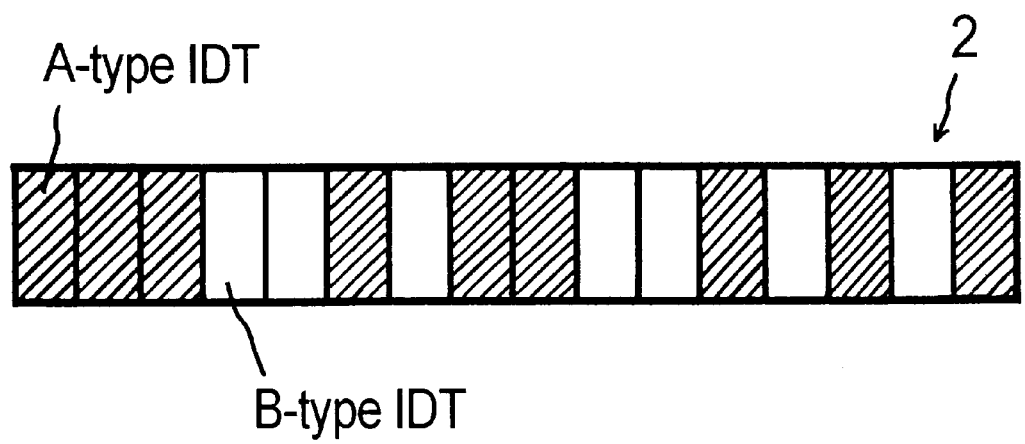
FIG. 3 shows a schematic illustration of individual coded IDT 2.

FIG. 3 shows a schematic illustration of individual coded IDT 2. Individual coded IDT 2 is constructed of 16 coded IDTs classified into A- and B types, which correspond to first coded IDT 9 and second coded IDT 10, respectively. In short, individual coded IDT 2 has a mixed construction of nine A-type IDTs and seven B-type IDTs. In other words, individual coded IDT 2 consists of 48 interdigital electrode pairs classified into 16 electrode-pair groups, and has an individual coded pattern.

The master communication device corresponding with the detail communication device in FIG. 1 has the same construction as the detail communication device in FIG. 1, except for absence of setting switch 12. Thus, the master communication device comprises third piezoelectric substrate 6M, electrode terminal 7M, first bipolar-pulse generator 8M, first coded IDT 9M, second coded IDT 10M, interdigital electrodes $A_{0M}$ and $A_{1M}$, envelope detecting device 13M directly connected with interdigital electrodes $A_{0M}$ and $A_{1M}$, monopolar-pulse generator 14M, electrode terminal 15M, electrode terminal 16M, central interdigital electrode $B_{0M}$, left interdigital electrode $B_{1M}$, right interdigital electrode $B_{1M}$, second bipolar-pulse generator 18M, intermediary IDT 19M, third coded IDT 20M, fourth coded IDT 21M, detecting device 22M, and electrode terminal 23M. Thus the recognition system for identification-card singularity has a simple structure with s small size.

In the recognition system for identification-card singularity composed of the identification card and the detail communication device in FIG. 1 and the corresponding master communication device, if the identification card is set in the detail communication device, electrode terminal 4 and electrode terminal 5 are connected at regular intervals with first bipolar-pulse generator 8 and envelope detecting device 13, respectively, via setting switch 12. In this time, a pulse generated at first bipolar-pulse generator 8 is applied to individual coded IDT 2, so that an individual SAW corresponding to the individual coded pattern is excited on first piezoelectric substrate 1. The individual SAW is detected as an individual coded burst-signal at interdigital electrode $I_0$, and after a time corresponding to the distance L, at interdigital electrode $I_1$ again. The individual coded burst-signals at interdigital electrodes $I_0$ and $I_1$ form an individual double-coded burst-signal, which arrives at monopolar-pulse generator 14 via envelope detecting device 13. Thus, an individual double-coded digital-signal is obtained at monopolar-pulse generator 14. The individual double-coded digital-signal is composed of an individual double-coded row of 49 monopolar digital-pulses, of which each is made from one burst at interdigital electrode $I_0$ and the previous burst at interdigital electrode $I_1$. For example, a third digital-pulse is based on a third burst at interdigital electrode $I_0$ and a second burst at interdigital electrode $I_1$. Thus, the individual double-coded digital-signal, consisting of 49 monopolar digital-pulses in all, is delivered into a digital network via electrode terminal 15. Moreover, because of the use of monopolar-pulse generator 14, a monopolar-type transmission is realized. However, the use of a bipolar-pulse generator in place of monopolar-pulse generator 14 enables a bipolar-type transmission superior in transmission ability to the monopolar-type transmission.

On the other hand, when the individual double-coded digital-signal arrives at the corresponding master communication device, it is received at left interdigital electrode $B_{-1M}$ and right interdigital electrode $B_{1M}$, respectively, via electrode terminal 16M. In this time, first- and second SAWs are excited on third piezoelectric substrate 6M. The first SAW arrives at central interdigital electrode $B_{0M}$ by a time corresponding to the distance L before the second SAW arrives at central interdigital electrode $B_{0M}$. Because both the first- and second SAWs are composed of a row of 49 burst waves corresponding to the 49 monopolar digital-pulses of the individual double-coded row, one burst wave of the first SAW and the previous burst wave of the second SAW consequently arrive at central interdigital electrode $B_{0M}$ simultaneously. Thus, a first step of a signal decoding is achieved. As a result, the individual double-coded digital-signal is converted into an individual mono-coded burst-signal at central interdigital electrode $B_{0M}$. The individual mono-coded burst-signal is converted into an individual mono-coded digital-signal, that is, an individual mono-coded row of high-frequency bipolar-pulses, at second bipolar-pulse generator 18M. The individual mono-coded digital-signal is applied to intermediary IDT 19M. And then, a third SAW composed of an individual coded row of 48 burst-waves, which are classified into 16 burst-wave groups, is excited on third piezoelectric substrate 6M. When the burst-wave group correlates to the third coded pattern, a first decoded pulse is detected at third coded IDT 20M. In the same way, when the burst-wave group correlates to the fourth coded pattern, a second decoded pulse is detected at fourth coded IDT 21M. Thus, a second step of the signal decoding is achieved. As a result, an output digital-signal, which is composed of nine first decoded pulses and seven second decoded pulses and is equivalent to the individual coded pattern, is detected at electrode terminal 23M via detecting device 22M without the influence of noises. Thus, the identification-card singularity is recognized from the output digital-signal. As a result, the master communication device keeps on communicating with the detail communication device while the identification card is set in the detail communication device.

In addition, double-coded request digital-signal asking for password is delivered from electrode terminal 15M into the digital network for further securing such a communication system. In order to make the double-coded request digital-signal, first of all, a request digital-signal is applied to first bipolar-pulse generator 8M via electrode terminal 7M, and bipolar pulses (−1 and 1) are generated at first bipolar-pulse generator 8M. When the bipolar pulses (−1 and 1) are applied to first coded IDT 9M and second coded IDT 10M, respectively, fourth- and fifth SAWs corresponding to the first- and second coded patterns, respectively, are excited on third piezoelectric substrate 6M. The fourth SAW is detected as a first coded burst-signal at interdigital electrode $A_{0M}$, and after a time corresponding to the distance L, at interdigital electrode $A_{1M}$, again. The first coded burst-signals at interdigital electrodes $A_{0M}$ and $A_{1M}$ form a first double-coded burst-signal, which arrives at monopolar-pulse generator 14M via envelope detecting device 13M. Thus, a first double-coded digital-signal is obtained at monopolar-pulse generator 14M. The first double-coded digital-signal is composed of a first double-coded row of four monopolar digital-pulses, of which each is made from one burst at interdigital electrode $A_{0M}$ and the previous burst at interdigital electrode $A_{1M}$. For example, a third digital-pulse is based on a third burst at interdigital electrode $A_{0M}$ and a second burst at interdigital electrode $A_{1M}$. Thus, the first double-coded digital-signal is composed of four monopolar digital-pulses in all. In the same way, the fifth SAW is converted into a second double-coded digital-signal at monopolar-pulse generator 14M. The first- and second double-coded digital-signals form the double-coded request digital-signal, which is delivered into the digital network via electrode terminal 15M.

When the first double-coded digital-signal of the double-coded request digital-signal is received at electrode terminal 16 through the digital network, it is applied to left interdigital electrode $B_{-1}$ and right interdigital electrode $B_1$, respectively. In this time, first- and second SAWs are excited on second piezoelectric substrate 6. The first SAW arrives at central interdigital electrode $B_0$ by a time corresponding to the distance L before the second SAW arrives at central interdigital electrode $B_0$. Because both the first- and second SAWs are composed of a row of four burst waves corresponding to the four monopolar digital-pulses of the first double-coded row, one burst wave of the first SAW and the previous burst wave of the second SAW consequently arrive at central interdigital electrode $B_0$ simultaneously. As a result, the first double-coded digital-signal is converted into a first mono-coded burst-signal at central interdigital electrode $B_0$. The first mono-coded burst-signal is converted into a first mono-coded digital-signal, that is, a first mono-coded row of high-frequency bipolar-pulses, at second bipolar-pulse generator 18. The first mono-coded digital-signal is applied to intermediary IDT 19. And then, a third SAW composed of a first coded row of three burst-waves is excited on second piezoelectric substrate 6. When the third SAW correlates to the third coded pattern, a first decoded pulse is detected at third coded IDT 20. In the same way, if the second double-coded digital-signal of the double-coded request digital-signal is received at electrode terminal 16 through the digital network, it is converted into a second mono-coded digital-signal at second bipolar-pulse generator 18. The second mono-coded digital-signal is applied to intermediary IDT 19. And then, a third SAW composed of a second coded row of three burst-waves is excited on second piezoelectric substrate 6. When the third SAW correlates to the fourth coded pattern, a second decoded pulse is detected at fourth coded IDT 21. As a result, an output digital-signal equivalent to the request digital-signal is detected at electrode terminal 23 via detecting device 22 without the influence of noises. In this time, a password digital-signal is applied to first bipolar-pulse generator 8 via electrode terminal 7. The password digital-signal is converted into a double-coded password digital-signal at monopolar-pulse generator 14, and is delivered into the digital network via electrode terminal 15. When the double-coded password digital-signal is received at electrode terminal 16M through the digital network, it is converted into an output digital-signal equivalent to the password digital-signal, and is detected at detecting terminal 23M via detecting device 22M without the influence of noises.

Figure 4:
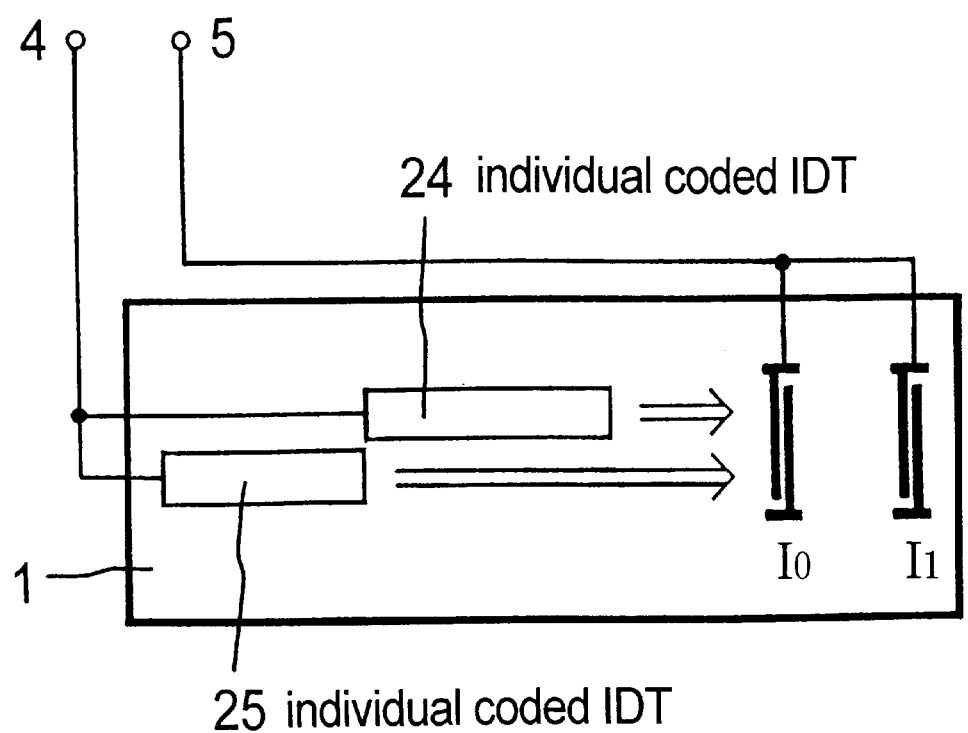
FIG. 4 shows a schematic illustration of another identification card in place of the identification card in FIG. 1.

FIG. 4 shows a schematic illustration of another identification card in place of the identification card in FIG. 1. The identification card in FIG. 4 has the same construction as FIG. 1 except for individual coded IDT 24 and individual coded IDT 25, which are in place of individual coded IDT 2. Individual coded IDT 24 and individual coded IDT 25 are in uneven parallel with each other, and located such that the distance between individual coded IDT 24 and interdigital electrode $I_0$ is shorter than that between individual coded IDT 25 and interdigital electrode $I_0$. When the pulse generated at first bipolar-pulse generator 8 is applied to individual coded IDT 24 and individual coded IDT 25, respectively, first- and second individual SAWs are excited on first piezoelectric substrate 1. The first individual SAW is detected as a first individual coded burst-signal at interdigital electrode $I_0$, and after a time corresponding to the distance L, at interdigital electrode $I_1$ again. The second individual SAW is detected as a second individual coded burst-signal at interdigital electrode $I_0$ just after the first individual coded burst-signal is detected at interdigital electrode $I_0$. And the second individual SAW is detected at interdigital electrode $I_1$ again, just after the first individual coded burst-signal is detected at interdigital electrode $I_1$. The first- and second individual coded burst-signals at interdigital electrodes $I_0$ and $I_1$ form a mixed double-coded burst-signal corresponding to the individual double-coded burst-signal received at envelope detecting device 13 in FIG. 1.

Figure 5:
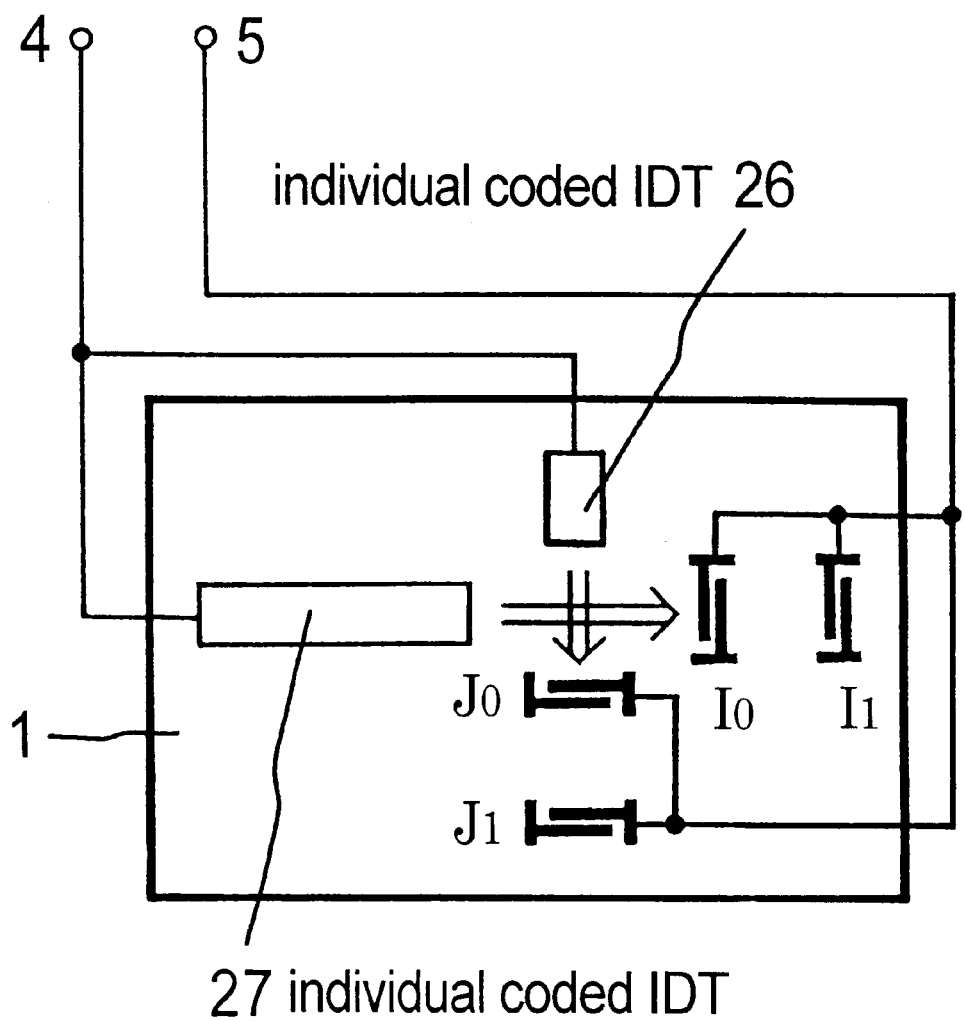
FIG. 5 shows a schematic illustration of a still other identification card in place of the identification card in FIG. 1.

FIG. 5 shows a schematic illustration of a still other identification card in place of the identification card in FIG. 1. The identification card in FIG. 5 comprises individual coded IDT 26, individual coded IDT 27, interdigital electrodes $I_0$ and $I_1$, and fourth electrode-group 28 consisting of interdigital electrodes $J_0$ and $J_1$. When the pulse generated at first bipolar-pulse generator 8 is applied to individual coded IDT 26 and individual coded IDT 27, respectively, first- and second individual SAWs are excited on first piezoelectric substrate 1. The first individual SAW is detected as a first individual coded burst-signal at interdigital electrode $J_0$, and after a time corresponding to the distance L, at interdigital electrode $J_1$ again. The second individual SAW is detected as a second individual coded burst-signal at interdigital electrode $I_0$ just after the first individual coded burst-signal is detected at interdigital electrode $J_0$. And the second individual SAW is detected at interdigital electrode $I_1$ again, just after the first individual coded burst-signal is detected at interdigital electrode $J_1$. The first individual coded burst-signals at interdigital electrodes $J_0$ and $J_1$, and the second individual coded burst-signals at interdigital electrodes $I_0$ and $I_1$ form a mixed double-coded burst-signal corresponding to the individual double-coded burst-signal received at envelope detecting device 13 in FIG. 1.

Figure 6:
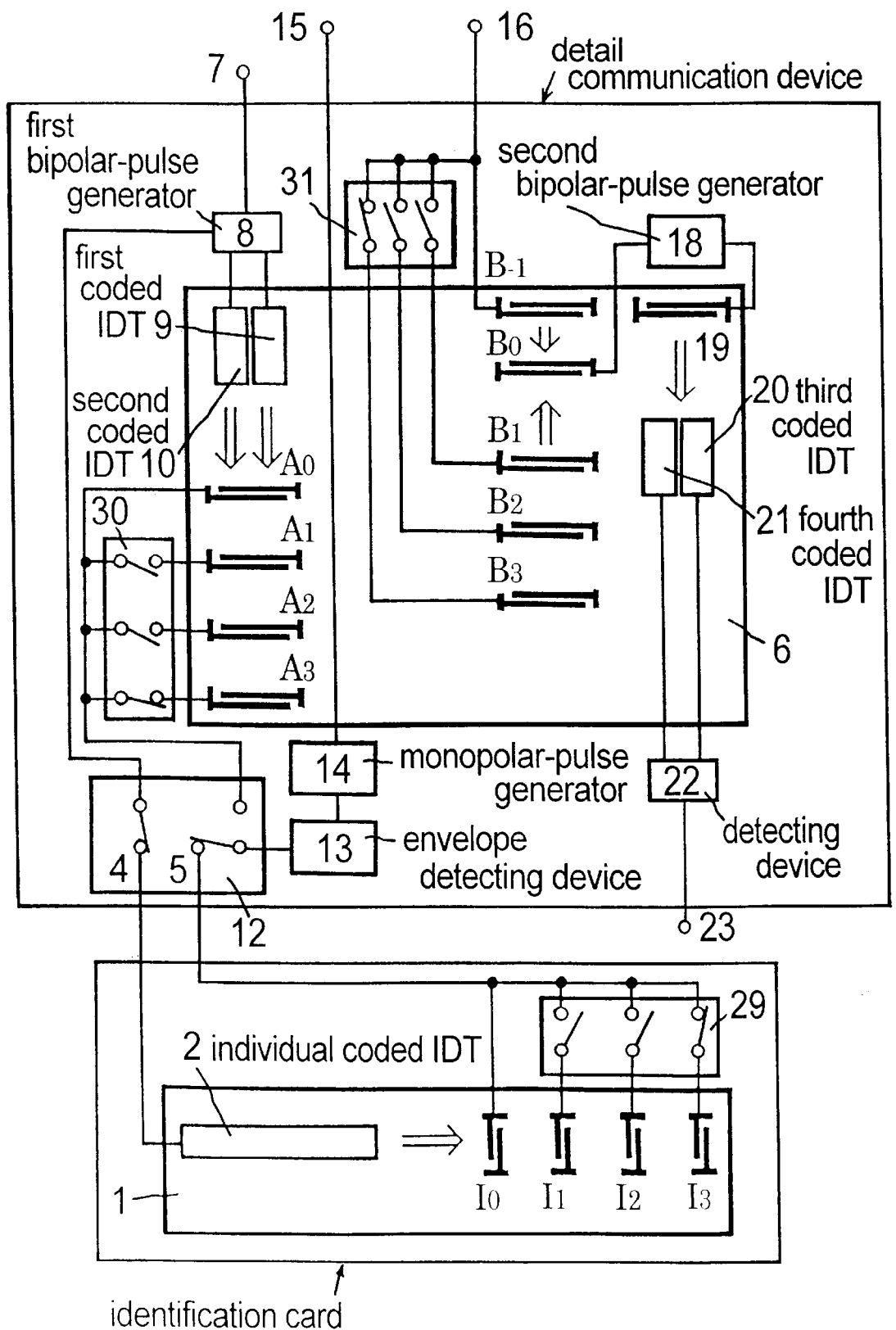
FIG. 6 shows a schematic illustration of the detail communication device with the identification card according to a second embodiment.

FIG. 6 shows a schematic illustration of the detail communication device with the identification card according to a second embodiment. The identification card has the same construction as FIG. 1, except for further comprising first switch 29, and interdigital electrodes $I_2$ and $I_3$, which are included in first electrode-group 3. A distance between interdigital electrodes $I_1$ and $I_2$, and that between interdigital electrodes $I_2$ and $I_3$ are the same as the distance L. Interdigital electrodes $I_2$ and $I_3$ have an interdigital periodicity of 40 μm, respectively. The detail communication device has the same construction as FIG. 1, except for further comprising second switch 30, third switch 31, interdigital electrodes $A_2$ and $A_3$, included in second electrode-group 11, and right interdigital electrodes $B_2$ and $B_3$, included in third electrode-group 17. A distance between interdigital electrodes $A_1$ and $A_2$, and that between interdigital electrodes $A_2$ and $A_3$ are the same as the distance L. Interdigital electrodes $A_2$ and $A_3$ have an interdigital periodicity of 40 μm, respectively. A distance between right interdigital electrodes $B_1$ and $B_2$, and that between right interdigital electrodes $B_2$ and $B_3$ are the same as the distance L. A distance between central interdigital electrode $B_0$ and right interdigital electrode $B_2$ is $L_0+2L$, and that between central interdigital electrode $B_0$ and right interdigital electrode $B_3$ is $L_0+3L$. Right interdigital electrodes $B_2$ and $B_3$ have an interdigital periodicity of 40 μm, respectively.

The master communication device corresponding with the detail communication device in FIG. 6 has the same construction as the detail communication device in FIG. 6, except for absence of setting switch 12. Thus, the master communication device comprises third piezoelectric substrate 6M, electrode terminal 7M, first bipolar-pulse generator 8M, first coded IDT 9M, second coded IDT 10M, interdigital electrodes $A_{0M}$, $A_{1M}$, $A_{2M}$ and $A_{3M}$, second switch 30M, envelope detecting device 13M directly connected with interdigital electrodes $A_{0M}$ and second switch 30M, monopolar-pulse generator 14M, electrode terminal 15M, electrode terminal 16M, third switch 31M, central interdigital electrode $B_{0M}$, left interdigital electrode $B_{-1M}$, right interdigital electrode $B_{1M}$, $B_{2M}$, and $B_{3M}$, second bipolar-pulse generator 18M, intermediary IDT 19M, third coded IDT 20M, fourth coded IDT 21M, detecting device 22M, and electrode terminal 23M.

In the recognition system for identification-card singularity composed of the identification card and the detail communication device in FIG. 6 and the corresponding master communication device, if the identification card is set in the detail communication device, electrode terminal 4 and electrode terminal 5 are connected at regular intervals with first bipolar-pulse generator 8 and envelope detecting device 13, respectively, via setting switch 12. In this time, a pulse generated at first bipolar-pulse generator 8 is applied to individual coded IDT 2, so that an individual SAW corresponding to the individual coded pattern is excited on first piezoelectric substrate 1. The individual SAW is detected as an individual coded burst-signal at interdigital electrode $I_0$, and after a time corresponding to the distance L, 2L and 3L, at interdigital electrodes $I_1$, $I_2$, and $I_3$, respectively. The use of first switch 29 enables that the individual coded burst-signal at one of interdigital electrodes $I_1$, $I_2$, and $I_3$ arrives at envelope detecting device 13 via electrode terminal 5. The individual coded burst-signal at interdigital electrode $I_0$ and that at one of interdigital electrodes $I_1$, $I_2$, and $I_3$ form an individual double-coded burst-signal, which arrives at monopolar-pulse generator 14 via envelope detecting device 13. Thus, an individual double-coded digital-signal is obtained at monopolar-pulse generator 14. The individual double-coded digital-signal is composed of an individual double-coded row of monopolar digital-pulses, of which each is made from an (n)th burst at interdigital electrode $I_0$, and an (n−1)th burst at interdigital electrode $I_1$, or an (n−2)th burst at interdigital electrode $I_2$, or an (n−3)th burst at interdigital electrode $I_3$. For example, a sixth monopolar digital-pulse is based on a sixth burst at interdigital electrode $I_0$ and a third burst at interdigital electrode 13. Thus, the individual double-coded digital-signal, consisting of 49, 50 or 51 monopolar digital-pulses in all, is delivered into a digital network via electrode terminal 15.

On the other hand, if the individual double-coded digital-signal arrives at the corresponding master communication device, it is received at left interdigital electrode $B_{-1M}$ and one of right interdigital electrodes $B_{1M}$, $B_{2M}$, and $B_{3M}$, via electrode terminal 16M. In this time the use of third switch 31M enables that the individual double-coded digital-signal arrives at one of right interdigital electrodes $B_{1M}$, $B_{2M}$, and $B_{3M}$. Thus, a first SAW is excited at left interdigital electrode $B_{-1M}$, and a second SAW is excited at one of right interdigital electrodes $B_{1M}$, $B_{2M}$ and $B_{3M}$, on third piezoelectric substrate 6M. Central interdigital electrode $B_{0M}$ receives the first SAW, and after a time corresponding to the distance L, 2L or 3L the second SAW. Both the first- and second SAWs are composed of a row of 49, 50 or 51 burst waves corresponding to the monopolar digital-pulses of the individual double-coded row. Therefore, at the same time that an (n)th burst wave of the first SAW arrives at central interdigital electrode $B_{0M}$, an (n−1)th burst wave of the second SAW at right interdigital electrodes $B_{1M}$, or an (n−2)th burst wave of the second SAW at right interdigital electrodes $B_{2M}$, or an (n−3)th burst wave of the second SAW at right interdigital electrodes $B_{3M}$ consequently arrives at central interdigital electrode $B_{0M}$. For example, a fourth burst wave of the first SAW and a second burst wave of the second SAW at right interdigital electrodes $B_{2M}$ arrive at central interdigital electrode $B_{0M}$ simultaneously. As a result, the individual double-coded digital-signal is converted into an individual mono-coded burst-signal at central interdigital electrode $B_{0M}$. The individual mono-coded burst-signal is converted into an individual mono-coded digital-signal at second bipolar-pulse generator 18M. The individual mono-coded digital-signal is applied to intermediary IDT 19M, so that a third SAW composed of an individual coded row of 48 burst-waves, which are classified into 16 burst-wave groups, is excited on third piezoelectric substrate 6M. When the burst-wave group correlates to the third- and fourth coded patterns, respectively, first- and second decoded pulses are detected at third coded IDT 20M and fourth coded IDT 21M, respectively. As a result, an output digital-signal equivalent to the individual coded pattern is detected at electrode terminal 23M via detecting device 22M without the influence of noises. Thus, the identification-card singularity is recognized from the output digital-signal.

For further securing such a communication system, a double-coded request digital-signal asking for password is made by the master communication device. In such a case, first of all, a request digital-signal is applied to first bipolar-pulse generator 8M via electrode terminal 7M, so that bipolar pulses (−1 and 1) are generated at first bipolar-pulse generator 8M. When the bipolar pulses (−1 and 1) are applied to first coded IDT 9M and second coded IDT 10M, respectively, fourth- and fifth SAWs corresponding to the first- and second coded patterns, respectively, are excited on third piezoelectric substrate 6M. The fourth SAW is detected as a first coded burst-signal at interdigital electrode $A_{0M}$, and after a time corresponding to the distance L, 2L and 3L at interdigital electrodes $A_{1M}$, $A_{2M}$, and $A_{3M}$, respectively. The first coded burst-signal at interdigital electrode $A_{0M}$ arrives at monopolar-pulse generator 14M via envelope detecting device 13M. The use of second switch 30M enables that the first coded burst-signal at one of interdigital electrodes $A_{1M}$, $A_{2M}$, and $A_{3M}$ arrives at monopolar-pulse generator 14M via envelope detecting device 13M. Thus, a first double-coded digital-signal is obtained at monopolar-pulse generator 14M. The first double-coded digital-signal is composed of a first double-coded row of monopolar digital-pulses, of which each is made from an (n)th burst at interdigital electrode $A_{0M}$, and an (n−1)th burst at interdigital electrode $A_{1M}$, or an (n−1)th burst at interdigital electrode $A_{2M}$, or an (n−3)th burst at interdigital electrode $A_{3M}$. As a result, the first double-coded digital-signal is composed of four, five or six monopolar digital-pulses in all. In the same way, the fifth SAW is converted into a second double-coded digital-signal at monopolar-pulse generator 14M. The first- and second double-coded digital-signals form the double-coded request digital-signal, which is delivered into the digital network via electrode terminal 15M.

When the first double-coded digital-signal of the double-coded request digital-signal is received at electrode terminal 16 through the digital network, it is applied to left interdigital electrode $B_{-1}$, and one of right interdigital electrodes $B_1$, $B_2$, and $B_3$ via third switch 31. In this time, a first SAW is excited at left interdigital electrode $B_{-1}$, and a second SAW is excited at one of right interdigital electrodes $B_1$, $B_2$ and $B_3$, on second piezoelectric substrate 6. Central interdigital electrode $B_0$ receives the first SAW, and after a time corresponding to the distance L, 2L or 3L the second SAW. As a result, the first double-coded digital-signal is converted into a first mono-coded burst-signal at central interdigital electrode $B_0$. Then, the first mono-coded burst-signal is converted into a first mono-coded digital-signal at second bipolar-pulse generator 18. The first mono-coded digital-signal is applied to intermediary IDT 19, so that a third SAW is excited on second piezoelectric substrate 6. In the same way, if the second double-coded digital-signal of the double-coded request digital-signal is received at electrode terminal 16 through the digital network, it is converted into a second mono-coded digital-signal at second bipolar-pulse generator 18. When the second mono-coded digital-signal is applied to intermediary IDT 19, a third SAW is excited on second piezoelectric substrate 6. If the third SAW correlates to the third- and fourth coded patterns, respectively, first- and second decoded pulses are detected at third coded IDT 20 and fourth coded IDT 21, respectively. As a result, an output digital-signal equivalent to the request digital signal is detected at electrode terminal 23 via detecting device 22 without the influence of noises. In this time, a password digital-signal is applied to first bipolar-pulse generator 8 via electrode terminal 7. The password digital-signal is converted into a double-coded password digital-signal at monopolar-pulse generator 14, and is delivered into the digital network via electrode terminal 15. If the double-coded password digital-signal is received at electrode terminal 16M through the digital network, it is converted into an output digital-signal equivalent to the password digital-signal, and is detected at detecting terminal 23M via detecting device 22M without the influence of noises.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A recognition system for identification-card singularity comprising:
   an identification card consisting of:
   a first piezoelectric substrate,
   an individual coded IDT (Interdigital Transducer) consisting of interdigital electrode pairs Pi (i=1, 2, ..., n), of which two neighbors are at a distance L from each other, and having an individual coded pattern,
   a first electrode-group consisting of an interdigital electrode $I_0$ and an interdigital electrode $I_i$ (i=1) at a distance iL (i=1) from said interdigital electrode $I_0$;
   a detail communication device attached to a detail computer and consisting of a second piezoelectric substrate and transmitting- and receiving sections, said transmitting section being composed of
   a first bipolar-pulse generator,
   a first coded IDT consisting of interdigital electrode pairs Pi (i=1, 2, ..., n), of which two neighbors are at said distance L from each other, and having a first coded pattern,
   a second coded IDT with the same construction as said first coded IDT except for having a second coded pattern,
   a second electrode-group consisting of an interdigital electrode $A_0$ and an interdigital electrode $A_i$ (i=1) at said distance iL (i=1) from said interdigital electrode $A_0$,
   an envelope detecting device connected with said second electrode-group,
   a monopolar-pulse generator; and
   a master communication device attached to a master computer and having the same construction as said detail communication device, and consisting of a third piezoelectric substrate and transmitting- and receiving sections, said receiving section being composed of
   a third electrode-group consisting of a central interdigital electrode $B_{0M}$, a left interdigital electrode $B_{-1M}$ at a distance $L_0$ from said central interdigital electrode $B_{0M}$, and a right interdigital electrode $B_{iM}$ (i=1) at a distance $L_0+iL$ (i=1) from said central interdigital electrode $B_{0M}$,
   a second bipolar-pulse generator,
   an intermediary IDT,
   a third coded IDT with the same construction as said first coded IDT except for having a third coded pattern,
   a fourth coded IDT with the same construction as said first coded IDT except for having a fourth coded pattern, and
   a detecting device,
      said first bipolar-pulse generator generating a pulse while said identification card is set in said detail communication device,
      said individual coded IDT exciting an individual SAW (Surface Acoustic Wave) on said first piezoelectric substrate when receiving said pulse,
      said interdigital electrode $I_0$ detecting an individual coded burst-signal corresponding to said individual coded pattern,
      said interdigital electrode $I_i$ detecting said individual coded burst-signal after a time corresponding to said distance iL, said envelope detecting device receiving an individual double-coded burst-signal made from said individual coded burst-signals at said interdigital electrodes $I_0$ and $I_i$, said monopolar-pulse generator causing an individual double-coded digital-signal via said envelope detecting device, and delivering said individual double-coded digital-signal into a digital network, said left interdigital electrode $B_{-1M}$ and said right interdigital electrode $B_{iM}$ exciting first- and second SAWs, respectively, on said third piezoelectric substrate when receiving said individual double-coded digital-signal from said digital network, said second bipolar-pulse generator causing an individual mono-coded digital-signal from said first- and second SAWs via said central interdigital electrode $B_{0M}$, said intermediary IDT exciting a third SAW composed of an individual coded row of burst-wave groups on said third piezoelectric substrate when receiving said individual mono-coded digital-signal, said third- and fourth coded IDTs detecting first- and second decoded pulses, respectively, when each of said burst-wave groups correlates to said third- and fourth coded patterns, respectively, said detecting device detecting an output digital-signal, which is based on said first- and second decoded pulses and is equivalent to said individual coded pattern, and recognizing the identification-card singularity from said output digital-signal.

2. A recognition system for identification-card singularity as defined in claim 1, wherein said transmitting section of said master communication device delivers a coded request digital-signal asking for password into said digital network just after recognition of said identification-card singularity, said receiving section of said detail communication device receives said coded request digital-signal asking for password from said digital network, said first bipolar-pulse generator generates bipolar pulses (−1 and 1) that form a password digital-signal, except when generating said pulse for said identification card at regular intervals, said first- and second coded IDTs excite fourth- and fifth SAWs on said second piezoelectric substrate when receiving said bipolar pulses (−1 and 1), respectively, said interdigital electrode $A_0$ detects a coded burst-signal corresponding to said first- and second coded patterns, respectively, said interdigital electrode $A_i$ detects said coded burst-signal after a time corresponding to said distance iL, said envelope detecting device receives a double-coded burst-signal made from said coded burst-signals at said interdigital electrodes $A_0$ and $A_i$, said monopolar-pulse generator causes a double-coded digital-signal via said envelope detecting device, and delivers said double-coded digital-signal into said digital network, said left interdigital electrode $B_{-1M}$ and said right interdigital electrode $B_{1M}$ receive said double-coded digital-signal simultaneously from said digital network, said detecting device detects an output digital-signal equivalent to said password digital-signal.

3. A recognition system for identification-card singularity as defined in claim 1, wherein said first-, second-, third-, and fourth coded IDTs consist of at least three interdigital electrode pairs, respectively.

4. A recognition system for identification-card singularity as defined in claim 1, wherein said third- and fourth coded patterns are in reverse to said first- and second coded patterns, respectively.

5. A recognition system for identification-card singularity as defined in claim 1, wherein said individual coded IDT is constructed of multiple times four coded IDTs classified into at most two types that correspond to said first- and second coded IDTs, respectively.

6. A recognition system for identification-card singularity as defined in claim 1 further comprising a bipolar-pulse generator in place of said monopolar-pulse generator.

7. A recognition system for identification-card singularity as defined in claim 1, wherein said individual coded IDT comprises at least two parts that are electrically separated and in uneven parallel with each other, said at least two parts excite at least two individual SAWs, respectively, on said first piezoelectric substrate when receiving said pulse from said first bipolar-pulse generator simultaneously, said interdigital electrode $I_0$ detects at least two individual coded burst-signals one by one when receiving said at least two individual SAWs, said interdigital electrode $I_i$ also detects said at least two individual coded burst-signals one by one when receiving said at least two individual SAWs, said at least two individual coded burst-signals at said interdigital electrodes $I_0$ and $I_i$ forming a mixed double-coded burst-signal corresponding to said individual double-coded burst-signal received at said envelope detecting device.

8. A recognition system for identification-card singularity as defined in claim 1, wherein said identification card further comprises a fourth electrode-group consisting of an interdigital electrode $J_0$ and an interdigital electrode $J_i$ (i=1) at a distance iL (i=1) from said interdigital electrode $J_0$, said individual coded IDT comprises first- and second parts that are electrically separated and vertical from each other, said first- and second parts excite first- and second individual SAWs, respectively, on said first piezoelectric substrate when receiving said pulse from said first bipolar-pulse generator simultaneously, said interdigital electrode $J_0$ detects a first individual coded burst-signal corresponding to said first individual SAW, said interdigital electrode $J_i$ detects said first individual coded burst-signal again, said interdigital electrode $I_0$ detects a second individual coded burst-signal corresponding to said second individual SAW just after said interdigital electrode $J_0$ detects said first individual coded burst-signal, said interdigital electrode $I_i$ detects said second individual coded burst-signal just after said interdigital electrode $J_i$ detects said first individual coded burst-signal, said first- and second individual coded burst-signals at said interdigital electrodes $J_0$, $J_i$, $I_0$ and $I_i$ forming a mixed double-coded burst-signal corresponding to said individual double-coded burst-signal received at said envelope detecting device.

9. A recognition system for identification-card singularity as defined in claim 1, wherein said first electrode-group includes at least two interdigital electrodes $I_i$ $\{i=1, 2, \ldots, (n-1)\}$ at a distance $iL$ $\{i=1, 2, \ldots, (n-1)\}$, respectively, from said interdigital electrode $I_0$, said second electrode-group includes at least two interdigital electrodes $A_i$ $\{i=1, 2, \ldots, (n-1)\}$ at a distance $iL$ $\{i=1, 2, \ldots, (n-1)\}$, respectively, from said interdigital electrode $A_0$, said third electrode-group includes at least two right interdigital electrodes $B_{iM}$ $\{i=1, 2, \ldots, (n-1)\}$ at a distance $L_0+iL$ $\{i=1, 2, \ldots, (n-1l)\}$, respectively, from said central interdigital electrode $B_{0M}$, said identification card further comprises a first switch that connects said envelope detecting device with said at least two interdigital electrodes $I_i$ in turn, said transmitting section further comprises a second switch that connects said envelope detecting device with said at least two interdigital electrodes $A_i$ in turn, said receiving section further comprises a third switch that connects said digital network with said at least two right interdigital electrode $B_{iM}$ in turn.

* * * * *